United States Patent [19]
Porter

[11] Patent Number: 5,985,314
[45] Date of Patent: *Nov. 16, 1999

[54] BOLUS FOR SUPPLYING BIOLOGICALLY BENEFICIAL SUBSTANCES TO RUMINANT ANIMALS

[76] Inventor: William Leslie Porter, Animax Limited, Shepherds Grove West, Stanton, Bury St. Edmunds, Suffolk IP31 2AR, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/968,139

[22] Filed: Nov. 12, 1997

Related U.S. Application Data

[63] Continuation-in-part of application No. 08/798,358, Feb. 10, 1997, abandoned, and a continuation-in-part of application No. 08/876,614, Jun. 16, 1997, Pat. No. 5,869,083, which is a continuation-in-part of application No. 08/588,125, Jan. 18, 1996, abandoned, said application No. 08/798,358, is a continuation-in-part of application No. 08/155,268, Nov. 3, 1995, abandoned.

[30] Foreign Application Priority Data

Nov. 25, 1994 [GB] United Kingdom .................. 9423786

[51] Int. Cl.⁶ ..................................................... A23K 1/18

[52] U.S. Cl. .......................... 424/438; 424/485; 424/617; 424/630; 424/639; 424/641; 424/646; 424/667; 424/702; 424/722

[58] Field of Search .................................... 424/438, 485, 424/617, 630, 639, 641, 667, 702, 727, 646; 804/892.1

[56] References Cited

U.S. PATENT DOCUMENTS

| | | | |
|---|---|---|---|
| 4,578,263 | 3/1986 | Whitehead | 424/15 |
| 4,643,893 | 2/1987 | Ascher et al. | 424/16 |
| 5,252,561 | 10/1993 | Hornykiewytsch et al. | 514/23 |

FOREIGN PATENT DOCUMENTS 2271282   4/1994   United Kingdom .

*Primary Examiner*—Neil S. Levy
*Attorney, Agent, or Firm*—Edwin D. Schindler

[57] ABSTRACT

A bolus for supplying a biologically beneficial substance to a ruminant animal, which includes a binder constituted by a rosin matrix, preferably pine rosin, together with a ballast material, such a zinc, with the biologically beneficial substance being dispersed in the binder, so that, in use, the biologically beneficial substance is released by leaching from the non-eroding body of the bolus. A pocket may be included in the body of the rosin bolus, which pocket erodes to release an additional biologically beneficial substance.

6 Claims, No Drawings

BOLUS FOR SUPPLYING BIOLOGICALLY BENEFICIAL SUBSTANCES TO RUMINANT ANIMALS

CROSS-REFERENCE TO RELATED APPLICATIONS

This is a continuation-in-part of application Ser. No. 08/798,358, filed Feb. 10, 1997, now abandoned, which is, in turn, a continuation-in-part of application Ser. No. 08/552,689, filed Nov. 3, 1995, now abandoned.

This is also a continuation-in-part of application Ser. No. 08/876,614, filed Jun. 16, 1997, now U.S. Pat. No. 5,869,083, which is, in turn, a continuation-in-part of application Ser. No. 08/588,125, filed Jan. 18, 1996, now abandoned.

BACKGROUND OF THE INVENTION

1. Technical Field of the Invention

The present invention relates to a bolus for oral administration to ruminant animals, such as cattle, sheep, goats and deer, with a biologically beneficial substance, i.e., a substance with beneficial nutritional or therapeutic effects.

2. Description of the Prior Art

In the prior art known to the inventor, Laby, U.S. Pat. No. 3,844,18,5, issued Oct. 29, 1974, relates to a plastic capsule, which splits into two interconnected parts to enable retention in the rumen. Laby specifically teaches against the use of a ballasted matrix. Furthermore, Laby discloses, apart from a splitting aspect, only the use of a plastic or gelatin capsule, of which the present invention specifically seeks to avoid, as further discussed herein.

Whitehead, U.S. Pat. No. 5,342,576, issued Aug. 30, 1994, discloses an aluminum sheath enclosing pellets of beneficial substances. The magnesium manganese alloy of Whitehead, other than enclosing pellets of beneficial substances, would appear to have little in common with that of the present invention.

Lucas, U.S. Pat. No. 4,505,711, discloses a deposit device for delivering biologically active substances to the digestive tract, which consists of a kind of metal or nylon bobbin carrying a cylindrical matrix of a wax, in which beneficial substances may be incorporated. The bobbin is intended to be the ballast, whereby the bolus is retained in the ruminant stomachs. Unlike Lucas, which utilizes a wax matrix, the present invention employs a rosin, such as pine rosin, which differs substantially from a wax. Wax is generally soft at room temperature, while the rosin of the present invention is hard and brittle at room temperature. In any event, in contrast to Lucas, the present invention does not require use of a bobbin to carry the base matrix.

Finally, Fezzi et al., U.S. Pat. No. 5,068,108, issued Nov. 26, 1991, discloses a controlled release protective matrix for zoo-technical and veterinary use. More specifically, Fezzi et al. discloses a carrier matrix obtained by processing a lipidic material. The matrix takes the form of a paste and is quite incapable of use as a bolus for oral administration. The Fezzi et al. matrix, in contrast to the present invention, is intended to be used as an additive to animal feed or fodder. The non-self-supporting Fezzi et al. paste is not capable of providing a prolonged release of a beneficial substance, even if carried by a bobbin, as disclosed by Lucas, U.S. Pat. No. 4,505,711, or a sheath, as disclosed by Whitehead, U.S. Pat. No. 342,5576.

SUMMARY OF THE INVENTION

According to one aspect of the present invention, there is provided a bolus for oral administration to a ruminant animal, said bolus being adapted for long-life retention in the rumen to supply a biologically beneficial substance to the animal over an extended period of time, of at least one month, said bolus comprising:

a rosin matrix;

a non-soluble ballast material bound in the rosin matrix, said ballast material comprising any one or combination of iron, manganese, copper, zinc and non-soluble compounds thereof; and, a water soluble, biologically beneficial substance dispersed in the rosin matrix to be leached from the bolus over the said extended period of time, said biologically beneficial substance comprising any one, or combination of, soluble compounds of the nutrients, selenium, iodine, manganese, chromium, cobalt, zinc and copper.

In a preferred bolus of the present invention, the rosin matrix has incorporated therein, a pocket comprising an eroding matrix of non-toxic binding material, wherein is dispersed a further biologically beneficial substance constituted by a non-soluble cobalt or zinc compound.

The bolus may also have included therein, at least one of any of the biologically beneficial substances comprising vitamins, lipids, amino acids, anthelmintics, antibacterial substances, including antibiotics, growth promoters, hormones, coccidiostats and flukicides, such substances, when soluble, being incorporated in the rosin matrix and the pocket and such substances, when insoluble, being incorporated in the pocket.

According to another aspect of the present invention, there is provided a bolus for oral administration to a ruminant animal, said bolus being adapted for long-life retention in the rumen to supply biologically beneficial substances to the animal over an extended period of time, of at least one month, said bolus comprising:

a rosin matrix;

a ballast material bound in the rosin matrix, said ballast material comprising any one, or combination, of non-toxic, non-water soluble metals and metal compounds;

a water-soluble, first biologically beneficial substance dispersed in the rosin matrix to be leached from the bolus over the said extended period of time;

a pocket in the bolus comprising a matrix of eroding material exposed to the surface of the bolus and having dispersed therein a non-soluble, second biologically beneficial substance.

The ballast is primarily included to ensure long life (i.e., of at least one month) in the reticulo-rumen.

In the case of a bolus incorporating a ballast material, more particularly, a non-toxic heavy metal or metal compound, the preferred relative proportions, by weight, of the constituents of the bolus are:

1) rosin—3 to 70%, preferably 8 to 40%, and most preferably about 18%, where trace elements and ballast are incorporated; but when a large dose of a fine powder, such as zinc oxide is incorporated, then the rosin presence may be 45 to 50%, by weight;

2) ballast—25 to 95%, preferably 50 to 85%, and most preferably about 70%; and, 3) beneficial substance—1 to 30%, preferably 3 to 25%, and most preferably, about 12%.

It is an advantage of the invention that the rosin matrix, with contained ballast, is able to remain for a long period in the alimentary tract without appreciable loss by erosion. Consequently, the size and density of the bolus are substantially maintained and the risk of regurgitation or passing on is greatly reduced. The contained beneficial substance(s) are released from the matrix, over the long period for which the bolus is retained in the alimentary tract, by leaching rather than bolus erosion. However, when an eroding pocket is included in the bolus, beneficial substance(s) dispersed in the pocket are gradually released by erosion of the pocket.

The bolus, in accordance with the present invention, is preferably retained in the alimentary tract for a period of up to several months. The bolus can readily be produced with a size and weight to meet this requirement.

Correct rates of release of the beneficial substance(s), while the bolus resides in the reticulo-rumen may be ensured, if necessary, by the inclusion in the bolus, also uniformly dispersed therein, of a substance which dissolves relatively quickly, thereby creating a porosity in the bolus which aids the release of the beneficial substance. Up to 20%, by weight, of such a quickly dissolving substance may be incorporated.

A preferred bolus having an eroding pocket may incorporate, in one of the rosin matrix and the eroding matrix pocket, a biologically beneficial substance constituted by any one, or combination of, non-toxic substances comprising iron, manganese, copper, zinc, selenium, iodine, cobalt, chromium and compounds thereof, vitamins, lipids, amino acids, anthelmintics, antibacterial substances, including, e.g., antibiotics, growth promoters, hormones, coccidiostats and flukicides, any such substances, when insoluble, being incorporated in the eroding matrix pocket.

According to, still, another aspect of the present invention, there is provided a bolus for oral administration to a ruminant animal adapted for long life retention in the rumen to supply a biologically beneficial substance to the animal over an extended period of time (i.e., of at least one month), said bolus comprising:

a rosin matrix;

an insoluble, non-toxic ballast material incorporated into the matrix; and, a water soluble, biologically beneficial substance dispersed in the matrix to be leached therefrom over the said extended period of time, said soluble biologically beneficial substance comprising any one, or combination of, a non-toxic soluble metal compound, vitamins, lipids, amino acids, anthelmintics, antibacterial substances, including antibiotics, growth promoters, hormones, coccidiostats, flukicides and surfactants.

A preferred rosin is pine rosin.

More especially, when a prolonged, relatively high dose of the beneficial substance is required, a double bolus may be produced, comprising two boluses of approximately normal size and weight joined, preferably, at the mid-points, by a connecting piece and, preferably, of a flexible, non-toxic material, resistant to chemical or biological breakdown in the reticulo-rumen. The configuration of the interconnected parts prevents the double bolus from being passed on or being regurgitated. The double bolus is, preferably, administered as a unit comprising an open-ended tube, for example, of cardboard, in which the two boluses are packed end-to-end, so that the tube, which quickly disintegrates in the reticulo-rumen, then releases the two strung-together individual boluses to be retained.

The ballast material may be constituted by iron, manganese, copper, zinc or one or more non-soluble compounds thereof, but is preferably constituted by elemental zinc. Results indicate that zinc and other ballasts are not appreciably lost during the life of the bolus. The weight and density of the bolus are, thus, maintained, permitting prolonged retention of the bolus in the reticulo-rumen. A preferred ballast is therefore elemental zinc.

The bolus in accordance with the present invention is remarkably versatile. It is, therefore, emphasized that the biologically beneficial substance(s) incorporated may be any one or more nutrients, such as the trace elements selenium, cobalt, iodine, manganese, zinc and/or copper. Copper, selenium, iodine and cobalt are particularly beneficial nutrients for cattle, while selenium, cobalt, copper, iodine and manganese are particularly beneficial for sheep. Zinc compounds, such as zinc oxide, may be incorporated for fungal conditions, such as facial eczema. Other beneficial nutrients, which may be incorporated, possibly in conjunction with trace elements, are vitamins, lipids, such as phospho-lipid, and amino acids. Alternatively, however, the biologically beneficial substance(s) may be at medicament, such as anthelmintics, antibacterial substances, growth promoters, hormones, coccidiostats and/or flukicides, again, either alone or in combination with nutrients. Non-water soluble additives (i.e., nutrients or medicaments) are desirably incorporated in the eroding pocket when this is provided in the bolus.

When a quick release agent for creating porosity of the rosin matrix is incorporated, this is preferably constituted by potassium iodide, but other possibilities for use as a quick release agent are NaCl and sugar, amongst many others.

DETAILED DESCRIPTION OF A PREFERRED EMBODIMENT

An example of a preferred formulation of the bolus in accordance with the present invention is as follows:

| Material | Weight Incorporated |
| --- | --- |
| Zinc | 74.77 g |
| Rosin | 18.58 g |
| Potassium Iodide | 1.31 g |
| Calcium Iodate | 6.15 g |
| Sodium Selenite | 0.85 g |
| Cobalt Carbonate | 1.41 g |
| TOTAL WEIGHT OF BOLUS | 103.01 g |

This formulation is suitable for cattle, for which an overall weight of bolus in the range of 30 to 170 g, preferably 50 to 150 g, and typically about 100 g, is most suitable. A bolus for sheep, which would generally have a different formulation, would normally have an overall weight in the range of 5 to 35 g, preferably, 7 to 25 g typically about 15 g. A bolus for a calf would typically have a weight of 5 to 120 g, preferably 20 to 80 g, most preferably about 50 g.
Trials A trial has been carried out in respect of iodine retention in the case of a test bolus of the following formulation: Iron: 30 g; Pine Rosin: 5.7 g; and, Potassium Iodide: 2.35 g, with the following results:

Blood Iodine Content

| | Start | 1 week | 3 weeks | 5 weeks |
| --- | --- | --- | --- | --- |
| Control Animal | 13.9 | 30.6 | 16.3 | 19.3 |
| Test Animal Given Bolus | 11.1 | 302.0 | 126.3 | 87.8 |

Other trials have been carried out with the following boluses, in order to test release rates of the beneficial elements incorporated:

| Bolus 1 | Zn (ballast) | 75.3 g |
|---|---|---|
| | Rosin (pine) | 18.0 g |
| | Potassium Iodide | 3.01 g |
| | Cobalt Carbonate | 0.39 g |
| | Sodium Selenite | 0.12 g |

Release Rates of Elements from the Bolus (In Percentages Released

| | 20 days | MDR | 42 days | MDR |
|---|---|---|---|---|
| Se | 19.57 | 0.98 | 8.70 | 0.21 |
| Co | 45.95 | 2.30 | 38.26 | 0.91 |
| I | 28.41 | 1.42 | 91.15 | 2.17 |
| Zn | | no release detected | | | where "MDR" represents the Mean Daily Release percentage.

This test shows, as do the further results which follow, that a satisfactory release rate is achieved for all the biologically beneficial trace elements without any substantial release of the ballast, which would disadvantageously indicate disintegration of the bolus.

| Bolus 2 | Zn (ballast) | 71.01 g |
|---|---|---|
| | Rosin (pine) | 18.30 g |
| | Potassium Iodide | 5.12 g |
| | Cobalt Carbonate | 1.08 g |
| | Sodium Selenite | 0.17 g |

Release Rates of Elements from the Bolus (In Percentages Released

| | 20 days | MDR | 42 days | MDR |
|---|---|---|---|---|
| Se | 16.67 | 0.83 | 39.39 | 0.94 |
| Co | 78.49 | 3.92 | 62.71 | 1.49 |
| I | 21.87 | 1.09 | 19.80 | 0.47 |
| Zn | | no release detected | | |

As a modification of the bolus in accordance with the present invention, it is possible to incorporate in the rosin matrix, for example, by means of a pocket sunk into the bolus and exposed to the bolus surface, biologically beneficial substances, especially non-soluble substances, as herein-before exemplified, but in an eroding formulation. Continual release of the substances contained in this eroding pocket is not terminated by regurgitation or passing on of the reducing eroding material, because this is retained within the body of the bolus, which does not substantially erode.

While only several embodiments of the present invention have been shown and described, it will be obvious to those skilled in the art that many modifications may be made to the present invention without departing from the spirit and scope thereof.

What is claimed is:

1. A bolus for oral administration to a ruminant animal, said bolus being adapted for long life retention in the rumen to supply a biologically beneficial substance to the ruminant animal over a period of time of at least one month, said bolus comprising:

a rosin matrix of a material exposed to a surface of said bolus and from which the biologically beneficial substance is leached over said period of time;

a non-soluble ballast material bound in said rosin matrix, said non-soluble ballast material comprising a member selected from the group consisting of iron, manganese, copper, zinc, non-soluble compounds of iron, non-soluble compounds of manganese, non-soluble compounds of copper, non-soluble compounds of zinc, and a combination thereof; and, a water soluble biologically beneficial substance dispersed in said rosin matrix to be leached from said bolus over said period of time, said biologically beneficial substance comprising a soluble compounds selected from the group consisting of selenium, iodine, manganese, chromium, cobalt, zinc, copper and a combination thereof.

2. The bolus for oral administration to a ruminant animal according to claim 1, wherein said rosin matrix is pine rosin.

3. A bolus for oral administration to a ruminant animal, said bolus being adapted for long life retention in the rumen to supply a biologically beneficial substance to the ruminant animal over a period of time of at least one month, said bolus comprising:

a rosin matrix of a material exposed to a surface of said bolus and from which the biologically beneficial substance is leached over time;

an insoluble, ballast material, being non-toxic to the ruminant animal to which said ballast material is to be administered, incorporated into said rosin matrix; and, a water soluble, biologically beneficial substance dispersed in said rosin matrix to be leached therefrom over said period of time, said water soluble biologically beneficial substance including a member selected from the group consisting of a soluble metal compound, being non-toxic to the ruminant animal to which said soluble metal compound is to be administered, a vitamin, a lipid, an amino acid, an anthelmintic, an anti-bacterial substance, a growth promoter, a hormone, a coccidiostat, a flukicide and a combination thereof.

4. The bolus for oral administration to a ruminant animal according to claim 3, wherein said anti-bacterial substance is an antibiotic.

5. The bolus for oral administration to a ruminant animal according to claim 3, wherein said rosin matrix is pine rosin.

6. The bolus for oral administration to a ruminant animal according to claim 3, wherein said insoluble, ballast material is a member selected from the group consisting of iron, a non-soluble iron compound, manganese, a non-soluble manganese compound, copper, a non-soluble copper compound, zinc, a non-soluble zinc compound and combination thereof.

* * * * *